United States Patent [19]
Uusitalo

[11] Patent Number: 5,511,717
[45] Date of Patent: Apr. 30, 1996

[54] MEANS FOR ALIGNING THE EDGES OF PLATE-LIKE BODIES TO BE WELDED

[76] Inventor: Tuomo Uusitalo, Isojoenrannantie 44, FIN-28240 Pori, Finland

[21] Appl. No.: 367,329

[22] Filed: Apr. 11, 1995

[30] Foreign Application Priority Data

Sep. 4, 1992 [FI] Finland .................................. 923970

[51] Int. Cl.⁶ .................................................. B23K 37/04
[52] U.S. Cl. ........................... 228/49.4; 228/212; 29/271
[58] Field of Search ................... 228/5.7, 44.3, 228/49.4, 212, 213; 29/267, 271, 283; 269/47, 49

[56] References Cited

U.S. PATENT DOCUMENTS

| | | | |
|---|---|---|---|
| 2,376,957 | 5/1945 | Buckley | 228/49.4 |
| 3,342,479 | 9/1967 | Howe | 269/204 |
| 3,875,645 | 4/1975 | Tucker et al. | 29/271 |
| 4,175,734 | 11/1979 | Williams | 269/49 |
| 4,475,726 | 10/1984 | Smith | 228/49.4 |
| 5,067,696 | 11/1991 | Morley | 269/49 |

FOREIGN PATENT DOCUMENTS

| | | | |
|---|---|---|---|
| 77130 | 11/1970 | Germany | 228/49.4 |
| 3628897 | 4/1987 | Germany . | |

*Primary Examiner*—Samuel M. Heinrich
*Attorney, Agent, or Firm*—Sughrue, Mion, Zinn, Macpeak & Seas

[57] ABSTRACT

The invention relates to a means for aligning the edges of plate-like bodies for welding said edges together, comprising a plate-like support member to be inserted into a gap between the edges to be welded, and support means positioned on the opposite sides of the plates and arranged to press the edges of the bodies to be welded into the same plane.

6 Claims, 3 Drawing Sheets

MEANS FOR ALIGNING THE EDGES OF PLATE-LIKE BODIES TO BE WELDED

The invention relates to a means for aligning the edges of plate-like bodies for welding said edges together, comprising a plate-like support member to be inserted into a gap between the edges to be welded, and support means positioned on the opposite sides of the plates and arranged to press the edges of the bodies to be welded into the same plane.

When metal plates are welded together so that the weld joint or seam will be long, there occurs problems in the alignment and welding of the plates if the plates are not straight and their bending and edge shapes differ from each other. The same problems occur when cylindrical or curved surfaces are welded together. Plate edges to be welded together are thereby very often in different planes, which causes welding problems. Plates edges are conventionally forced into the same plane by hammering or wedging. With greater plate thicknesses, it is possible to weld a beam to one plate so as to be able to lift or lower the edge of the plate as required. With a cylindrical body, is it also possible to support the edges to be welded from the inside of the cylinder by wedging or by using separate support beams. Problems occur especially when a cylinder or a similar tubular product to be welded is too small for the work to be done from the inside it but all measures have to be performed from the outside.

U.S. Pat. No. 3,875,645 teaches a means for aligning the edges of plates to be welded together into the same plane for making a local weld joint. The aligning means can be removed through the gap. However, the aligning means is very complicated in structure and thus difficult to use. As it comprises a great number of components and threaded parts of different types, it is also very difficult and time-consuming to adjust according to the thickness of the plates to be welded. It is further to be noted that when one welds together plates of unequal thickness, this aligning means does not enable the plate surfaces to be aligned into the same plane. In addition, a gap equal in width to the aligning means has to be left between the plates; in practise, the gap is very wide so that the aligning means cannot be used for aligning the edge surfaces of thin plates. A further drawback of this solution is that the thickness of the shaft used with narrow welding grooves is minimal, and so, in practice, its strength is usually insufficient for supporting the plates. Correspondingly, if the thickness of the shaft is increased, the welding groove has to be very wide, which is not possible with thin plates; with thick plates, the strength of the shaft is not sufficient for bending the plates.

U.S. Pat. No. 3,342,479 teaches a means for aligning the edges of plate blanks to be welded. The aligning means comprises a locking pin, a strip extending through the gap between the plates, and a means for tightening the strip. The locking pin and the strip tightening means are positioned on opposite sides of the plate blanks to be welded. The locking pin is inserted into a hole provided in the strip, and then tightened by the aligning means against the surface of the plate blank while the other side of the plate blanks bears against the tightening means. The edges of the plates to be welded are now in the same plane and can be interconnected by welding. After welding, the strip is cut off by further tightening it, and the remaining part stays in place or drops away from the joint. The aligning means is very difficult to use e.g. for welding long cylindrical tubular structures as a support of some kind has to be placed behind the surface to be welded for supporting the strip so that it will not fall out of the hole. Furthermore, the tool is very complicated in structure and thus slow in use.

DE 3 628 897 teaches an aligning means for precisely connecting the abutting surfaces of thin plates for welding or soldering them together. This connecting means, however, remains at the joint after the welding or soldering, so that it is not reusable.

The object of the present invention is to provide an aligning means which avoids the abovementioned disadvantages and makes the alignment of plates easy and rapid, thus speeding up the welding process. This is achieved by means of an aligning means according to the invention which is characterized in that the support member is provided on one side with an abutment which is transverse to the support member and intended to be positioned against the surface of the upper body on the side of the abutment; that the support member is further provided at one edge with a plate-like pointed end support positioned at a distance from the abutment and forming an angle with the support member on the opposite side with respect to the abutment, and turning means for turning the aligning means in the direction of the joint to be welded, whereby, to align the bodies to be welded, the support member is inserted into the gap between the bodies with the pointed end support ahead and then turned into an upright position so that the abutment will bear against the surface of the upper body on the side of the abutment, and the pointed end support presses the lower surface of the other body towards the abutment so that the plates are displaced substantially into the same plane.

The invention is based on the idea that the aligning means comprises a plate-like support member which can be inserted into the gap between the plates to be welded. The bent, plate-like pointed end support of the support member supports the lower plate to be welded from the lower surface. Correspondingly, the aligning means comprises an abutment at its opposite side with respect to the plate-like pointed end support. The abutment will bear against the upper surface of the upper plate to be welded, thus forming a support surface about which the aligning means is turned so that the pointed end lifts the lower plate to be welded. As used in this patent application and claims, the term upper refers to the plate close to the abutment, and the term lower refers the plate remoter from the abutment. The aligning means can be inserted very easily and rapidly through the gap between the two plates to be welded and displaced in the longitudinal direction of the gap without difficulty. Another essential idea is that the pointed end of the aligning means is turned under the lower plate to be welded while the aligning means bears against the upside of the upper plate to be welded. The invention is further based on the idea that the member supporting the plate is very thin relative to the gap between the plates whereas it is long in the longitudinal direction of the gap, so that the pointed end of the aligning means is very steady in the direction of the gap to be welded. As used in this patent application, the term plate-like surface also refers to cylindrical and round surfaces and other similar surfaces.

A major advantage of the invention is that the aligning can be performed from one side of the plates and a single worker is able to do it without outside help. Accordingly, the welder is able to do the aligning alone during welding. The aligning means can be moved along the weld joint in its longitudinal direction as the welding proceeds, simultaneously aligning the surfaces of the plates to be welded into the same plane very easily and rapidly. The invention is especially useful in cases where the aligning has not been possible previously, i.e. in the welding of small tubular or similar products in which the present aligning means can be used for supporting. Another major advantage of the invention is that even a minor user force is sufficient to exert a great force on the plates to be welded for forcing the plates into the same plane. The aligning means also enables cylindrical bodies to be interconnected easily as the aligning means does not require any separate support to be positioned inside the cylindrical body, but the aligning means itself supports the body, and so the number of workers needed in the work process is reduced. Moreover, the aligning means according to the invention is extremely simple and easy to manufacture, being thus also economically advantageous.

In the following the invention will be described in more detail with reference to the attached drawings, in which FIG. 1 is a side view of an aligning means according to the invention with the shaft of the aligning means cut off;

Figure 1:
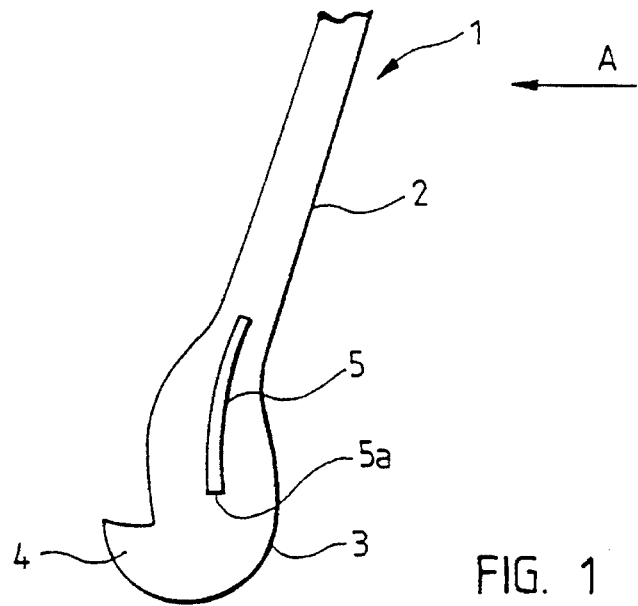

FIG. 1 shows a means 1 for aligning plates to be welded. The aligning means 1 comprises a shaft 2 acting as a turning means; a plate-like support member 3; a pointed end support 4 formed by bending the end portion of the plate-like support member 3; and an abutment 5 for the bent pointed end support 4. The surface in one end of the abutment forms a support surface 5a for the plate to be welded. The aligning means 1 can be turned on the support surface 5a so that the pointed end support 4 lifts the lower plate while the abutment 5 presses the other plate into the same plane. As shown in the figure, the support member 3 is made very wide as compared with its thickness in order that it would withstand strains and the torsion exerted on it in the direction of the gap remaining between the plates. Further, as the support member 3 is very thin, the aligning means can be used even with very narrow gaps. The plate-like support member 3 may be of uniform thickness or it may taper towards the pointed end support 4 in a wedge-like manner.

Figure 2:
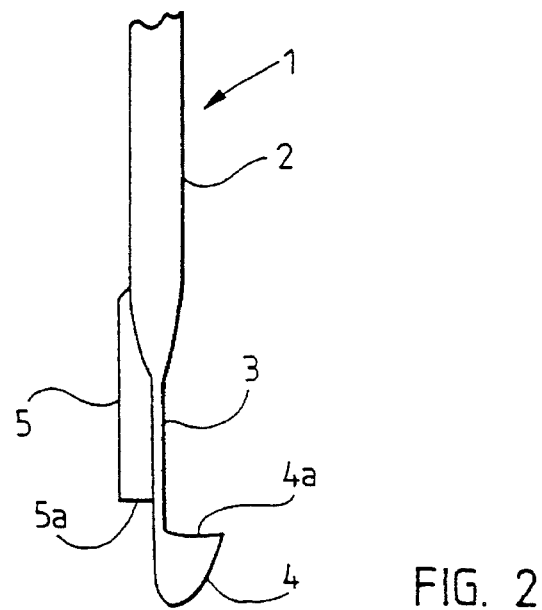
FIG. 2 shows the aligning means according to the invention in a direction indicated by the arrow A in FIG. 1 with the shaft of the aligning means cut off.

FIG. 2 shows the aligning means 1 in the direction indicated by the arrow A. The reference numerals used in FIG. 2 correspond to those used in FIG. 1. In addition to the parts mentioned above, FIG. 2 shows a support surface 4a in the pointed end support 4. The purpose of the support surface 4a is to lift the lower plate to be welded from its lower surface when the aligning means 1 is turned on the support surface 5a in the direction of the gap to be welded. At the same time the abutment 5 presses the upper plate to be welded downward, and the pointed end support 4 lifts the lower plate to be welded upward, so that the plates will be easily forced into the same plane.

Figure 3:
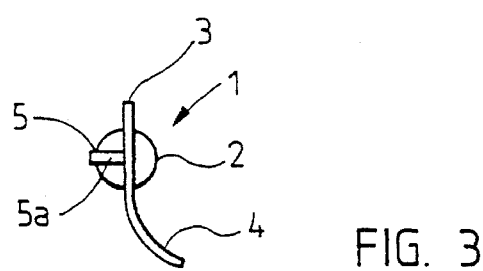
FIG. 3 shows the aligning means according to the invention as seen from the bottom end of the aligning means.

FIG. 3 shows the aligning means 1 from its bottom end. The references used in FIGS. 1 and 2 correspond to those used in FIG. 3. It appears clearly from FIG. 3 that the pointed end support 4 curves to the side opposite to the abutment 5, which adjoins the support member 3. It is further to be noted that the pointed end support 4 is preferably curved, curving at an angle of about 45° with respect to the support member 3 so that it is easily insertable into the gap between the plates to be welded.

Figure 4A:
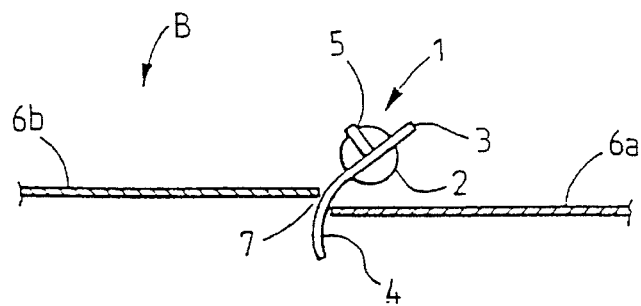
FIGS. 4a to 4c illustrate the positioning of the aligning means according to the invention in a seam to be welded and its operation in the alignment of the plates to be welded.
Figure 4B:
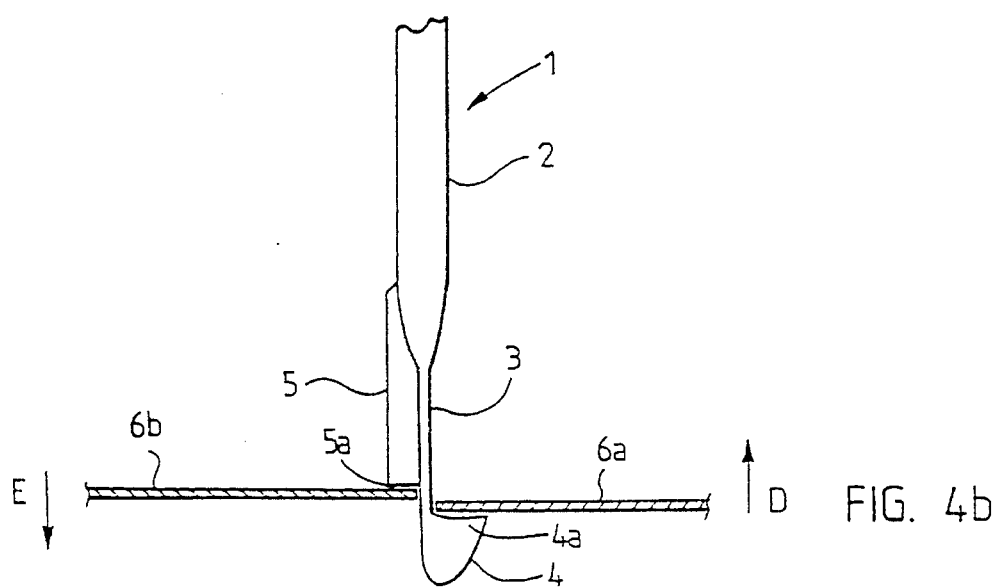
Figure 4C:
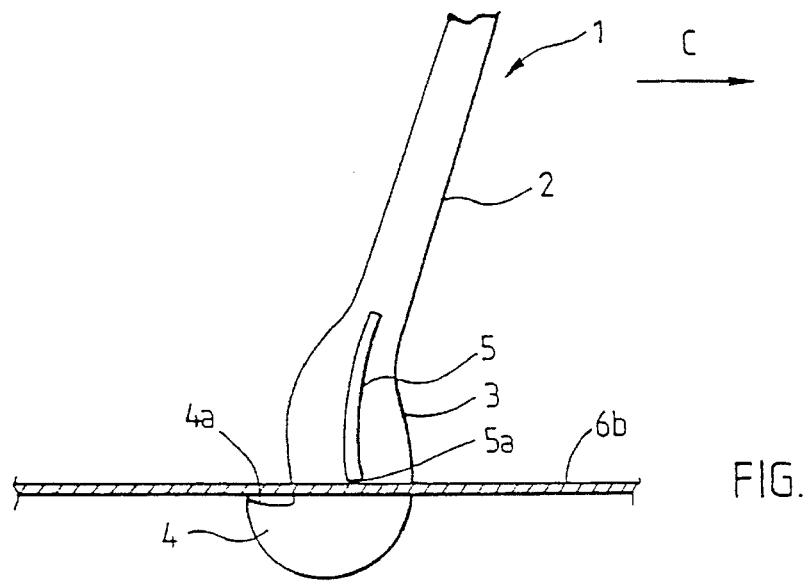

FIGS. 4a to 4c illustrate the insertion of the aligning means 1 into the gap between the plates to be welded and the use of the aligning means for aligning the plates. FIG. 4a shows plates 6a and 6b to be welded together which are in different planes, and the plate aligning means 1. When the insertion of the aligning means into a gap 7 between the plates 6a and 6b is started, the support member 3 is parallel with the plates 6a and 6b. The pointed end support 4 thereby points towards the gap 7 and the abutment 5 extends away from the surface of the plates 6a and 6b. After the pointed end support has been inserted into the gap 7, the aligning means 1 is turned about a longitudinal axis parallel to the shaft 2 as shown by the arrow B until the upper surface of the plate 6b meets the abutment 5. After the bent pointed end support 4 of the support member 3 has been turned entirely below the lower surface of the plate 6a, the support member 3 and thus the entire aligning means 1 is able to turn in the longitudinal direction of the gap 7. The support surface 4a of the pointed end support 4 thereby makes contact with the lower surface of the plate 6a, and the support surface 5a of the abutment 5 makes contact with the upper surface of the plate 6b, as shown in FIG. 4b. As the turning of the aligning means 1 is continued about the support surface 5a in a direction indicated by the arrow C in FIG. 4c, the pointed end support 4 lifts the plate 6a in a direction indicated by the arrow D while the abutment 5 presses the plate 6b downward in a direction indicated by the arrow E. When the plates 6a and 6b are in plane with each other, they can be welded together on both sides of the aligning means 1, whereby the aligning means 1 can be turned in a direction opposite to the direction indicated by the arrow C in FIG. 4c until the shaft 2 is substantially in parallel with the planes of the plates 6a and 6b. The aligning means 1 is then turned with respect to the longitudinal direction of the shaft 2 in a direction opposite to the direction indicated by the arrow B in FIG. 4a so that the support member 3 will be in parallel with the plane of the plates 6a and 6b. The aligning means 1 can be removed from the gap 7 and displaced to another position for aligning the plates.

In the side view shown in FIG. 4c, the plates 6a and 6b are in the same plane. A force parallel to the arrow C thereby acts on the shaft 2, and the aligning means 1 is pivoted about the support surface 5a in the longitudinal direction of the gap to be welded. The support surface 4a thereby lifts the plate 6a while the support surface 5a of the abutment 5 presses the plate 6b downward. The gap between the plates 6a and 6b can thereafter be welded on both sides of the aligning means 1, whereafter the force exerted on the aligning means 1 in the direction indicated by the arrow C can be decreased, and the aligning means 1 can be removed from the gap between the plates by turning the aligning means 1 in a direction opposite to the direction indicated by the arrow C until the shaft 2 is in parallel with the plate surface 6b. The aligning means 1 can then be turned in the direction of the longitudinal axis of the shaft until the pointed end support 4 has been removed from the gap to be welded.

Figure 5:
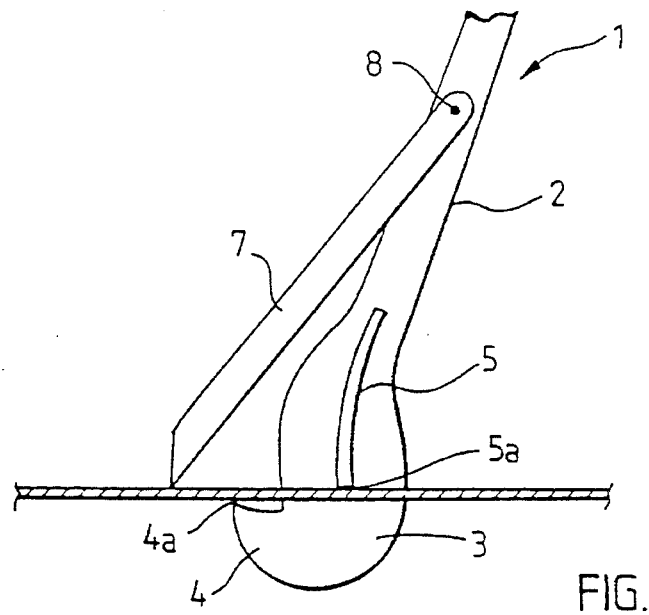
FIG. 5 shows a second embodiment of the aligning means according to the invention.

FIG. 5 shows a second embodiment of the invention, in which the aligning means further comprises a locking means i.e. a locking arm 7. The locking arm 7 is a rod-like part which is straight or curved, as required. It is attached to the shaft 2 by a rivet or a similar pivot means 8, and it can be turned substantially in parallel with the shaft 2 away from the support member 3 of the aligning means. When the aligning means is used, the locking arm can be turned into the position shown in FIG. 5. After the aligning means has forced the plates into the same plane, the locking arm 7 is pressed downward so that its point is pressed against the upper surface of one or both of the plates 6, thus locking the aligning means in position. In this situation, the welder is able to perform various measures without that the mutual position of the plates changes in this respect. At the simplest, the lower end of the locking arm 7 comprises a sharp edge which sticks easily to the surface of the plates. The end of the locking arm 7 close to the plates may also be provided with a rubber coating, or it may have a curved surface, comprising ribs extending transversely to the groove to be welded. It may also be realized in some other way, provided that when it is pressed downward, it keeps the aligning means in position so as lock the plates in their aligned position.

After the fixing welds of the plates have been made, the aligning means can be released from the locking state by turning it from the shaft 2 to the right in FIG. 5 while the locking arm 7 is drawn to the left in the figure. The removal of the aligning means from the welding gap then takes place as described above, and the work can be continued.

Figure 6A:
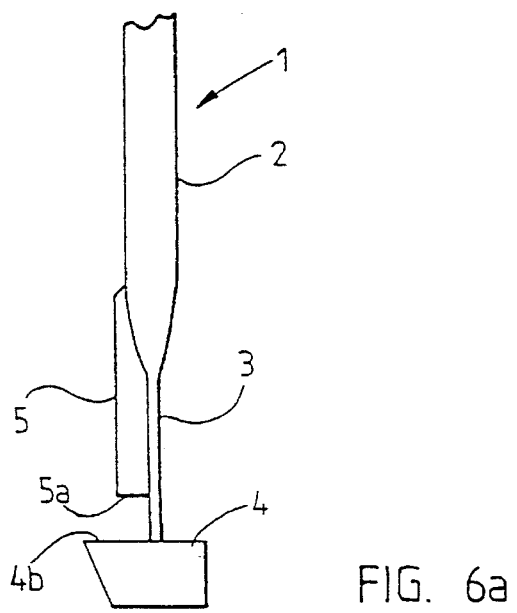
FIGS. 6a and 6b show a third embodiment of the aligning means according to the invention.
Figure 6B:
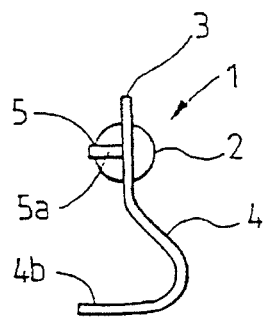

FIGS. 6a and 6b show a front and bottom view of a third embodiment of the aligning means according to the invention, in which the pointed end support comprises a separate aligning abut 4b. The aligning abut 4b is formed by bending a long strip-like part forming an extension of the pointed end support. The strip-like part is bent curvilinearly or with several wide angle bends in a direction opposite to the bending direction of the pointed end support 4 so that it is transverse to the support member 3 and extends to the other side of the plane defined by the support member 3. When the bending arch of the aligning abut 4b is large enough with respect to the thickness of the plates 6, the aligning means can be inserted into the gap between the plates to be welded with the tip of the aligning abut 4b ahead, whereafter the aligning means can be inserted into the gap between the plates as described above. When the aligning means is turned for aligning the plates, the pointed end support 4 lifts the lower plate upwards until the aligning abut 4b makes contact with the lower surface of both plates, thus indicating that they are in the same plane and making it still easier to detect the obtained alignment of the plates.

The figures and the description related to them are only intended to illustrate the idea of the invention. In its details, the aligning means according to the invention may vary within the scope of the claims. Accordingly, the abutment 5 in particular may be integral with the support member 3, and the pointed end support 4 may be bent several times so as to obtain an elongated support means, thus enabling the aligning of longer plate assemblies. The shaft 2 can be made in various ways; if a greater force is to be exerted on the plates to be aligned, the length of the shaft can be increased, and the distance between the abutment 5 and the pointed end support 4 can be varied. It is further to be noted that the aligning means can be used with several different plate thicknesses as the distance between the support surface 4a and the support surface 5a can be varied as required in the direction of the shaft 2. The abutment 5 may also be formed by perforating a portion apart from the support member 3 and then bending it transverse to the support member 3.

The aligning means can be realized in various ways; for instance, the rigid shaft attached to it may be replaced with a suitably jointed arm or e.g. a device operated by compressed air for creating the torsional force required for the aligning, provided that the pointed end support, the abutment and the support member are formed as specified in claim 1. Similarly, various supporting and locking means may be added to the aligning means for locking it in position during the welding after the alignment is completed.

In the figures, the abutment 5 is positioned only on one side of the aligning means according to the invention, i.e. on the opposite side with respect to the pointed end support 4. However, the invention can also be applied so that an abutment 5 is provided on both sides of the support member 3 substantially at corresponding points so that their counter surfaces 5a are in the same plane. In this way, the aligning of the upper surfaces of the plates into the same plane can also be detected in that the abutment on the side of the lower plate limits the rising of the plate while the pointed end support lifts it. This embodiment can be used as an alternative for or together with the solution shown in FIGS. 6a and 6b for indicating the obtained alignment of the surfaces. In the figures, the turning angles of the pointed end support and the aligning abut are shown to be substantially parallel with the longitudinal axis of the shaft, but they may vary in different ways. In one advantageous solution, the central lines of the turning angles of the arches of the pointed end support and the possible aligning abut are vertical in the situation shown in FIG. 5, in which the shaft 2 is slightly inclined with respect to the pointed end support 4. This facilitates the insertion of the aligning means into the gap and its turning movement about the curved portions of the pointed end support and the possible aligning abut.

I claim:

1. Means for aligning the edges of plate-like bodies for welding said edges together, comprising a plate-like support member to be inserted into a gap between the edges to be welded, and support means positioned on the opposite sides of the plates and arranged to press the edges of the bodies to be welded into the same plane, the support member being provided on one side with an abutment which is transverse to the support member and intended to be positioned against the surface of the upper body on the side of the abutment; the support member being further provided at one edge with a plate-like pointed end support positioned at a distance from the abutment and forming an angle with the support member on the side opposite to the abutment, and turning means for turning the aligning means in the direction of the joint to be welded, whereby, to align the bodies to be welded, the support member is inserted into the gap between the bodies with the pointed end support ahead and then turned into an upright position so that the abutment will bear against the surface of the upper body on its side and the pointed end support presses the lower surface of the other body towards the abutment so that the plates are displaced substantially into the same plane.

2. Aligning means according to claim 1, wherein the pointed end support and the support member are formed by a single integral plate-like body, and that the pointed end support has been bent into an angle with respect to the support member along a substantially curved line.

3. Aligning means according to claim 1, wherein the abutment and the support member are made of the same plate-like material, the abutment being formed by bending a portion of the support member to the side opposite to the pointed end support.

4. Aligning means according to claim 1, wherein the pointed end support comprises a plate-like aligning abutment formed by bending a plate-like portion forming an extension of the pointed end support in a direction opposite to the bending direction of the pointed end support relative to the support member so as to form a transverse support positioned substantially in the same plane as a support point of the pointed end support and extending across a plane defined by the support member and arranged to make contact with the lower surface of the plates to be aligned.

5. Aligning means according to claim 1, comprising an abutment positioned on both sides of the support member substantially at the same point.

6. Aligning means according to claim 1, wherein the turning means is formed by a lever attached to the support member.

* * * * *